March 2, 1965 J. N. BAUM ET AL 3,171,406
HEART BEAT FREQUENCY ANALYZER
Filed Sept. 26, 1961
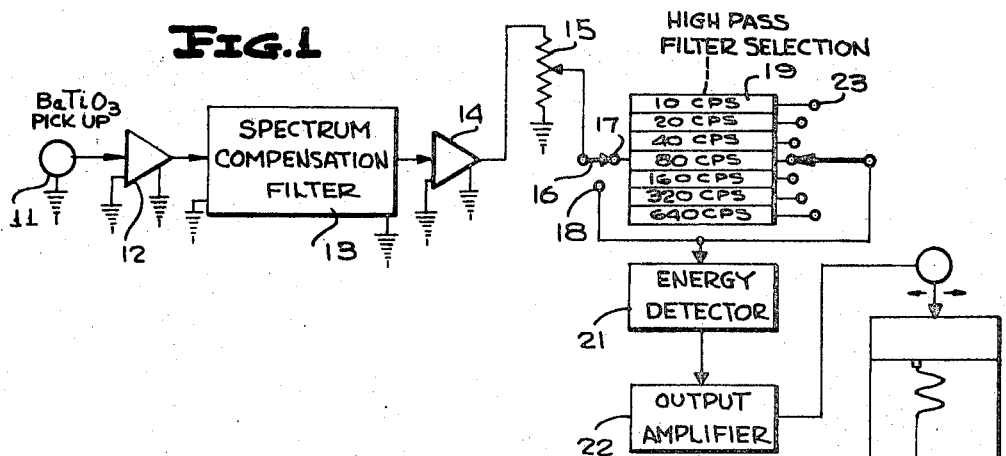
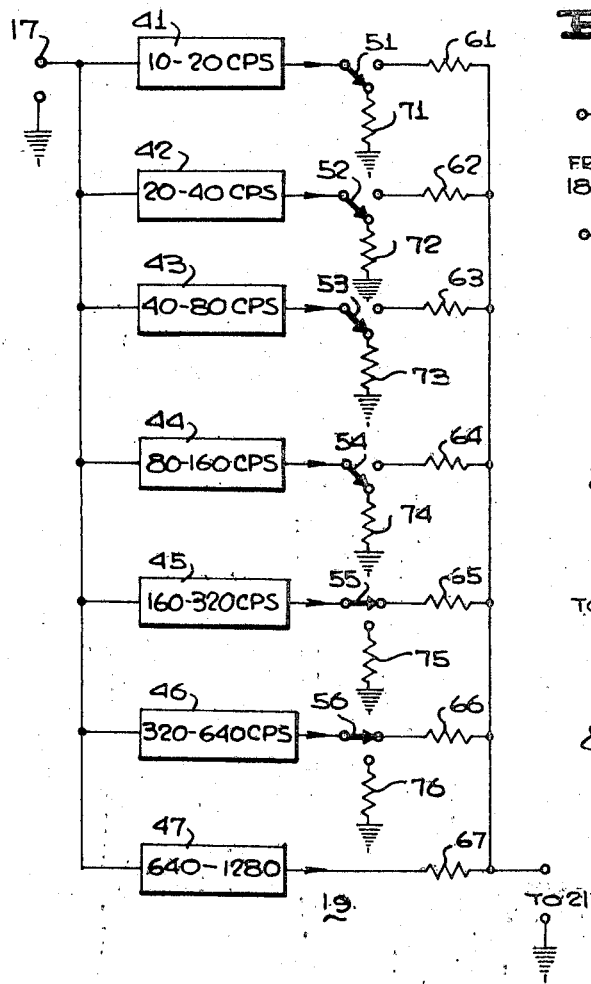
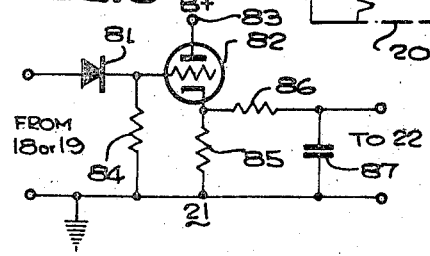
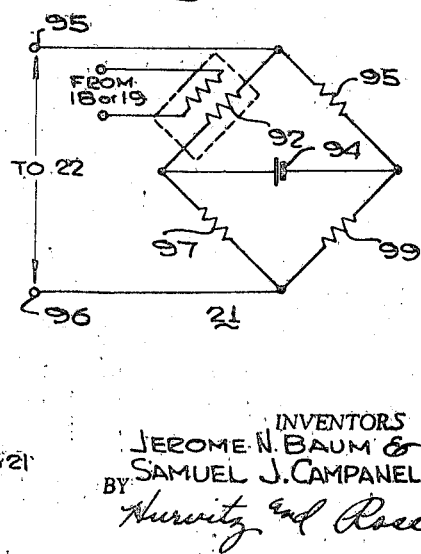
INVENTORS
JEROME N. BAUM &
SAMUEL J. CAMPANELLA
BY
ATTORNEYS

United States Patent Office 3,171,406
Patented Mar. 2, 1965

3,171,406
HEART BEAT FREQUENCY ANALYZER
Jerome N. Baum, Alexandria, and Samuel J. Campanella, Springfield, Va., assignors to Melpar, Inc., Falls Church, Va., a corporation of Delaware
Filed Sept. 26, 1961, Ser. No. 140,894
11 Claims. (Cl. 128—2.05)

The present invention relates generally to apparatus to assist in the analysis of heart defects and more particularly to apparatus for indicating the frequency components of a heart beat to permit an early determination of heart malfunction.

Recent research indicates heart malfunction is determinable from an analysis of the sounds which make up a heart beat. In the heart beat of an avearge human being, most of the sound energy content is between approximately 1 and 100 cycles per second and there are no detectable vibrations in excess of 400 cycles per second. However, it has been found that valvular defects resulting from rheumatic fever or congenital malformations produce detectable vibrations considerably in excess of 400 cycles per second. Also the low freqency vibrations, i.e. those between 1 and 40 cycles, increase in energy content with the approach of a coronary attack resulting from calcification or hardening of the heart muscles.

By providing an instrument capable of analyzing the frequency distribution of heart sounds, it is thus possible to ascertain the presence of heart defects which result from congenital diseases, valvular malfunction, and coronary thrombosis prior to the time these maladies have a manifest influence on the subject. Such an instrument, to be widely accepted and utilized by the medical profession, must be relatively inexpensive, easy to utilize and preferably adaptable to existing electrocardiograph recorders.

Basically, the present invention employs a transducer for converting the pressure waves detected in response to a heart beat into an electrical signal. The heart beat contains different frequency components indicative of the condition of the heart. The signal envelope containing these components is picked up by the transducer, amplified and supplied to a spectrum compensation filter. This filter compensates for the great difference in amplitude between the low and high frequency components of the picked-up signal. The compensating filter output signal is supplied via a level adjusting potentiometer to a spectrum analyzer.

The spectrum analyzer is essentially a variable cut-off high pass filter which is adjustable by the operator. For a particular subject under tests, the filter is set to pass only frequencies above a predetermined value and is successively set to pass only higher and higher frequencies. By utilizing a high pass filter with successively different cut-off frequencies, an indication of all energy above the selected cut-off frequency is presented at any time.

The output signal of the spectrum analyzer is supplied to an envelope energy detector, of the square law type. The response time of the detector is such that its output signal is a replica of a heart beat. In consequence, the detector output signal is not an instantaneous indication of the amplitude of the frequency components supplied to it but an average of these components over the heart beat duration. This detector obviates the need for sweep frequency generators which are too expensive for the average physician to procure. Also, the use of a detector that provides a replica of the heart beat enables existing electrocardiograph recorders, presently owned by many physicians, hospitals, clinics, etc., to be used for record display analysis. If a frequency scanning analyzer is employed, many electrocardiograph recorders are not satisfactory because their response times are frequently too long to record the instantaneous signal changes as the scan frequency is varied. The record for each frequency setting is compared against a record initially made of the entire spectrum. The signal level applied to the recorder for the initial record is adjusted until a predetermined record deflection is obtained to compensate for differences in the heart beat amplitudes and chest wall thicknesses among the subjects being tested.

It is an object of the present invention to provide new and improved apparatus for analyzing the frequency components of a signal, particularly an envelope type signal, such as a heart beat.

It is an additional object of the present invention to provide apparatus for analyzing heart beat frequency components wherein a replica of a heart beat is generated after the signal is passed through analyzer filters.

A further object of the invention is to provide a heart beat frequency analyzer which does not utilize a scanning frequency generator and consequently is adaptable to existing electrocardiograph recorders.

Another object of the present invention is to provide an instrument for heart beat frequency analysis wherein the amplitude of an initial, unfiltered heart beart envelope is normalized and utilized for comparison with filtered signals which are replicas of subsequent heart beats.

Yet another object is to provide an instrument for heart beat frequency analysis, which instrument is relatively inexpensive, facile in utilization, and readily adaptable to eelctrocardiograph recorders.

Yet an additional object is to provide a system for determining the frequency components of envelope type signals wherein a replica of the envelope is generated after the signal is passed through frequency analysis filters.

The above and still further objects, features and advantages of the present invention will become apparent upon consideration of the following detailed description of one specific embodiment thereof, especially when taken in conjunction with the accompanying drawings, wherein:

FIGURE 1 discloses a block diagram of a preferred embodiment of the system according to the present invention.

FIGURE 2 discloses one embodiment of the spectrum analysis filter of FIGURE 1.

FIGURE 3 discloses one preferred embodiment of the energy detector of FIGURE 1; and FIGURE 4 discloses another preferred embodiment of the energy detector of FIGURE 1.

FIGURE 1, the block diagram of the complete system according to a preferred embodiment of the present invention, includes a pressure or sound responsive pick-up which is secured exteriorly to the subject under test at a point where a heart beat pulse or undulation is readily obtainable, e.g. on the chest cavity. The pick-up 11 is preferably of the barium titanate type which is readily available but has a relatively high impedance across its output terminals. Of course it is to be understood other types of transducers, such as crystal or capacitor microphones may be employed for pick-up element 11.

Pick-up element 11 transduces the heart beat of the subject to which it is connected into an electrical signal which is supplied to high input impedance and high gain amplifier 12. The signal supplied to amplifier 12 by transducer 11 contains two detectable envelopes for each cycle of heart operation. In the average human, the predominant frequency components in each envelope are between 1 and 100 cycles per second. There are no detectable components above 400 cycles per second and the amount of energy in the frequency range below 1 cycle is relatively small. If, however, the subject being tested has a valvular heart defect, there is appreciable energy above 400 cycles in the envelopes supplied to amplifier 12. Also, the low frequency components of the signals supplied to amplifier 12 are appreciable with those subjects having malfunctions leading to the occurrence of a coronary thrombosis. This is probably due to calcification of the heart and the arteries in the circulatory system.

In order to provide a sufficiently high level signal to the remainder of the system amplifier 12 must have a gain of approximately 60 db and a high input impedance eight or more megohms, to prevent loading of the transducer 11. The output signal from amplifier 12 is supplied to spectrum compensating filter 13, having a frequency versus amplitude characteristic to derive an output signal which is a faithful replica of the heart sounds for the entire frequency band of energy produced in a heart beat.

Filter 13, preferably has an 18 db per octave input vs. output emphasizing characteristic between 10 and 1000 cycles because there is a twelve to eighteen db per octave roll-off of the frequency component associated with a heart beat. In a typical system, requiring a bandwidth of between 10 and 1000 cycles per second, filter 13 must have a spread of approximately 118 db between the extreme low and high frequency components. The filter may be constructed to reduce this spread to 90 db providing the 18 db per octave characteristic only between 20 c.p.s. and 640 c.p.s. without adverse consequences.

The output signal of spectrum compensating filter 13 is supplied through an isolating amplifier 14, preferably of the cathode follower type, to potentiometer 15 which variably controls the signal level supplied to recorder 20. Potentiometer 15 serves to normalize the record produced on recorder 20 for the different individuals tested with the device. The signal at the tap of potentiometer 15 is coupled via switch 16 to contacts 17 or 18, respectively, connected to spectrum analyzer 19 or energy detector 21.

With the armature of switch 16 positioned on contact 18, the signal from potentiometer 15 is coupled directly to energy detector 21 utilized for converting all of the frequency components of the detected heart beat into an envelope which is a faithful replica of the heart beat. The envelope is supplied through power output amplifier 22 to recorder 20. The pen of recorder 20 is deflected in accordance with the envelope of all of the heart beat energy detected by transducer 11.

With the armature of switch 16 engaging contact 17, the detected signal is supplied through variable filter 19, utilized for determination of the frequency components of the pressure waves in the heart beat. Spectrum analyzer 19 includes a variable filter which is manually controlled to select which predetermined frequency components of the signal picked up transducer 11 are supplied to recorder 20. In the embodiment of FIGURE 1 each filter in analyzer 19 is of the high pass type and is selected to have cut off frequencies separated by octaves, said cut off frequencies preferably being 20, 40, 80, 160, 320, and 640 cycles per second. The input signal to filter 19 is supplied in parallel to each of the seven high pass filters included therein. Switch 23 is sequentially positioned on the contacts of each high pass filter to vary the cut-off frequency of analyzer 19. At the cut off frequencies, the attenuation characteristic of each filter in analyzer 19 is down 3 db from the band pass amplitude while for frequencies which deviate by ten percent or more from cut frequency, the characteristic is down at least 40 db. The output signal of the frequency analyzer 19 is supplied through envelope detector 21 and output amplifier 22 to recorder 16 in the same manner as the unanalyzed signal supplied to recorder 20 from contact 18.

Detector 21 preferably has a square law response to provide an accurate indication of the energy supplied to it. Detector 21 converts the frequency component supplied to it from contact 18 or analyzer 19 into a unidirection signal envelope that is a faithful replica of a heart beat. This is accomplished by utilizing a detector having a response time of not less than 50 nor more than 100 milliseconds. The detector 19 response time is not less than 50 milliseconds because this is the minimum time that permits averaging of frequency components as low as 20 cycles. Response time of detector 19 must be greater than 100 milliseconds, however, to obtain a replica of the one cycle per second heart beat.

In use, the armature of switch 16 is initially positioned on contact 18 and transducer 11 is connected to the chest cavity of the subject. Operation of recorder 20 is initiated and the position of slider of potentiometer 15 is adjusted until maximum deflection of the recorder 20 brush reaches a predetermined value. Because the physical characteristics of each person vary in the amount of fat surrounding the heart and the size of the chest cavity etc., the slider of potentiometer 15 must be set at a different position for each individual. When the deflection of the pen of recorder 20 reaches a predetermined amplitude for each recorded heartbeat, the movable switch contact 16 is positioned to engage contact 17.

Filter 19 is set to pass all frequency components above 10 cycles per second. Accordingly at this setting, the record should provide an envelope having approximately the same maximum amplitude and width as when the armature of switch 16 engages contact 18. Filter 19 is maintained at this setting while two complete cycles of heart operation are recorded. The characteristic of filter 19 is then varied so that all sounds in excess of 20 cycles are passed and sounds less than this frequency are rejected by the filter. The analyzer 19 high pass filters are successively varied to produce similar records for cut-off frequencies of 40, 80, 160, 320 and 640 cycles.

In this manner, recorder 20 produces successive envelopes on a paper tape for heart beat sounds over the entire spectrum and for each heart beat spectrum in excess of each selected cut off frequency. Recorder 20 may be provided with means for automatically indicating at which frequency filter 19 is selected or such an indication is accomplished manually.

After all of the different high pass frequencies of filter 19 are selected, the heart beat replicas produced by recorder 16 are analyzed to determine possible heart malfunction. The analysis is conducted by observing whether there is appreciable decrease in the maximum amplitude and size of the recorded envelope as the filter is varied. There should be appreciable decreases when the filter characteristic is varied from cut off frequencies of 20 to 40 cycles and from 40 to 80 cycles and a slight further decrease when it is varied from a cut off frequency of 80 to 160 cycles. If a substantial change in the amplitude and width of the envelopes results prior to setting analyzer 19 at the 40 cycle cut off frequency, there is a strong indication of an oncoming coronary thrombosis in the subject. Any detectable envelope for cut off frequencies in excess of 320 cycles per second and 640 cycles per second provides a strong indication of a valvular disorder in the patient.

FIGURE 2 discloses one preferred embodiment of spectrum analyzer 19 which includes seven different band pass filters connected in parallel to terminal 17. The seven band pass filters 41–47 each have a total band width of one octave and are designed so their output signals which deviate by 10% or more from the band pass frequencies are at least attenuated 40 db. At the cut off frequencies of each filter, the output signal thereof is attenuated 3 db. The filters 41–46 are respectively designed to pass the following frequency octaves: 10 to 20 cycles, 20 to 40 cycles, 40 to 80 cycles, 80 to 160 cycles, 160 to 320 cycles, 320 to 640 cycles, and 640 to 1280 cycles. Output signals from filters 41–46 are selectively coupled through switches 51–56 and isolating resistors 61–66 to the input terminals of energy detector 21.

The output signal passed by each of the filters 41–47, supplied through the respective switches to the isolating resistors are summed together and fed to energy detector 21. Filter 47, having a band pass between 64 and 1000 cycles, is not supplied with a switch since it is always connected in the circuit. Switches 51–56 permit selective connection of the filter output terminals 41–46 into the circuit and provide the means for determining which frequency components of the heart beat signal are supplied to envelope detector 21. With switches 51–56 connected to engage filter terminating resistors 71–76, no energy from filters 41–46 is supplied to the input terminals of energy detector 21 which then receives only signals between 640 and 1000 cycles. Resistors 71–76 prevent reflections of the signals supplied through the respective filters. Reflections, if permitted, frequently result in harmonics of the original frequency signal at the input terminals of other filters to cause inaccurate results in the record.

In operation, each switch is initially positioned so that the output signal of the respective filter is coupled to the input terminals of detector 21. The switches are sequentially activated by a manual control knob, so that the various output signals from the filters are not supplied to the detector input terminals. For the switch configuration illustrated in the drawings, only the heart beat frequency components in excess of 160 cycles are passed by filter 19 to detector 21 since the armatures of switches 51–54 engage resistors 71–74 and the armatures of switches 55 and 56 are connected to resistors 65 and 66. The signals supplied to resistors 65, 66, and 67 are summed together and supplied to energy detector 21. All frequency components above 160 cycles in a single, detected heart beat are converted to a single envelope by the detector. This envelope varies in amplitude and width in accordance with the total energy content of the signal supplied thereto. A decrease in amplitude and width of the envelope supplied from the detector 21 to the recorder 20, as indicated by the record, provides an indication that the energy at frequencies above the selected frequency is considerably less than that of the initially passed envelope for all frequency bands.

The high pass filter arrangement of FIGURE 1 is adequate for most purposes and functions satisfactorily for minimum investment of components.

FIGURE 3 of the drawings discloses a preferred embodiment of detector 21 according to the present invention. Detector 21, in this embodiment, includes a square law type crystal diode 81 series connected between the output terminal of filter 19 and the grid of cathode follower tube 82. The anode of cathode follower tube 82 is connected in conventional manner to B+ terminal 83, and the grid of tube 82 is connected through grid leak resistor 84 to ground. The cathode of tube 82 is connected to ground by way of cathode load resistor 85 and to an integrating circuit consisting of resistor 86 and capacitor 87. The cathode follower 82 is provided between diode 81 and the integrator to prevent the accumulated charge on capacitor 87 from back biasing diode 81.

Diode 81 is of the square law type in order to provide an accurate indication of the heart beat energy. The rectified signal from diode 81 is applied through isolating tube 82 to the integrator resistance 86 and capacitor 87, connected across the input terminals of output amplifier 22. Because the system must be responsive to signals having frequencies as low as 10 cycles per second, the time constant of the integrating circuit is not less than 50 milliseconds. In order to preserve an accurate replica of the envelope of the one cycle per second heart beat, the time constant cannot exceed 100 milliseconds. With the time constant of the integrating circuit selected in this range, its output signal supplied to recorder amplifier 22 is an accurate reproduction of the envelope of the detected heart beat.

FIGURE 5 discloses still another circuit for detector 21. This detector is essentially a thermistor balanced bridge detector and includes a heating resistor 91, responsive to the signal from analyzer 19 or terminal 18. Resistance 91 generates heat in accordance with the square of the current supplied to it and influences the resistance of thermistor 92, connected as one arm of normally balanced bridge 93. Bridge 93 includes a D.C. source of energy 94, connected between opposite bridge arms, and output terminals 95 and 96 which are connected to the input terminals of amplifier 22. The positive terminal of battery 94 is connected to heat responsive resistance 92 and a conventional resistor 97 while the negative terminal of battery 94 is connected to the common terminals of resistors 98 and 99, which have their other ends respectively connected to terminals 95 and 96.

When no signal is supplied to resistor 91 the bridge impedances 92, 97, 98, and 99 are of such value that the D.C. potential between terminals 95 and 96 is zero. Upon application of a signal to heating resistor 91, bridge unbalance is affected; said unbalance being in accordance with the square of the current supplied to resistor 91 due to the $I^2R$ heating law. An output signal in the form of a detected envelope of the signal applied to resistance 91 is generated between terminals 95 and 96 and supplied to amplifier 92. In order to provide a faithful reproduction of the signal fed to the input terminals of bridge detector 21 of FIGURE 5, the bridge must have a time of response between fifty and one hundred milliseconds. While the detectors of both FIGURES 4 and 5 provide suitable response characteristics, the thermistor circuit of FIGURE 5 is preferable because it is inherently more accurate than the diode RC detector of FIGURE 4.

While we have described and illustrated one specific embodiment of our invention, it will be clear that variations of the details of construction which are specifically illustrated and described may be resorted to without departing from the true spirit and scope of the invention as defined in the appended claims.

What we claim is:

1. A system to aid in the detection of heart ailments comprising means for transducing undulations of the heart associated with a heart beat into a signal commensurate with said undulations, frequency analyzer means responsive to said signal for selectively passing frequencies of said signal in predetermined ranges, said analyzer including $n$ filters responsive to said source, said filters together having pass characteristics covering the frequency band $F_1$ to $F_n$ and means for recording a heart beat replica envelope containing the frequency components of said signal passed by said frequency analyzer means, means selectively connecting the outputs of said filters to said recording means, said connecting means and the responses of said filters being arranged such that all the energy deriving from said filters within the band $F_k$ to $F_n$ is supplied to said recording means, where $F_k$ is the cut off frequency at one end of the $k$th filter and $k=1, 2, \ldots n$.

2. A system to aid in the detection of heart ailments comprising means for transducing undulations of the heart associated wtih a heart beat into a signal commensurate with said undulations, frequency analyzer means responsive to said signal for selectively passing frequencies of said signal in predetermined ranges, said analyzer including $n$ filters responsive to said source, said filters together having pass characteristics covering the frequency band $F_1$ to $F_n$ and means for detecting a heart beat replica envelope containing the frequency components of said signal passed by said frequency analyzer means, means selectively connecting the outputs of said filters to said detecting means, said connecting means and the responses of said filters being arranged such that all the energy derived from said filters within the band $F_k$ to $F_n$ is supplied to said detecting means, where $F_k$ is the cut off frequency at one end of the $k$th filter and $k=1, 2, \ldots n$.

3. The system of claim 2 further including filter means responsive to said first electrical signal for compensating the amplitude level differences between the low and high frequency components of said signal.

4. The system of claim 3 wherein said detector means has a square law inputs vs. output characteristic.

5. The system of claim 4 wherein said detector includes a square law diode, an integrating circuit responsive to said diode output signal and means coupled between said diode and integrating circuit for preventing the back bias of said diode from being affected by the integrating circuit.

6. The system of claim 4 wherein said detector includes a normally balanced thermally responsive bridge.

7. The system of claim 2 wherein said detector means has a response time between 50 and 100 milliseconds.

8. The system of claim 2 wherein said filters are bandpass filters, the $k$th filter having a pass band between $F_k$ and $F_{k+1}$, and said connecting means includes means for selectively connecting the outputs of all said filters to said detector means.

9. The system of claim 2 wherein said filters are high pass filters, the $k$th filter having a cut off frequency of $F_k$, and said connecting means includes means for connecting the output of only one of said filters to said detector means at a time and for at will connecting the output of each filter to said detector means.

10. A system for analyzing the frequency spectrum of a signal source lying within a bandwidth $F_1$ to $F_n$ comprising $n$ filters responsive to said source, said filters together having pass characteristics covering the band $F_1$ to $F_n$, an amplitude detector, means selectively connecting the outputs of said filters to said detector, said connecting means and the responses of said filters being arranged such that all the enregy deriving from said filters within the band $F_k$ to $F_n$ is supplied to said detector, where $F_k$ is the cut off frequency at one end of the $k$th filter and $k=1, 2, \ldots n$, said filters being bandpass filters, the $k$th filter having a pass band between $F_k$ and $F_{k+1}$, and said connecting means includes means for selectively connecting the outputs of all said filters to said detector.

11. A system for determining the frequency content of heart sounds in the band between approximately 10 c.p.s. and 1000 c.p.s. comprising a transducer for converting the undulations of the heart sounds into an electrical signal, a spectrum analyzer responsive to said signal for selectively passing frequencies of said signals in predetermined ranges, said analyzer including $n$ filters responsive to said signal, said filters having pass characteristics covering the frequency band having limits between approximately 10 c.p.s., to 1000 c.p.s., detector means responsive to the output of said spectrum analyzer for deriving a signal having a waveform that is a replica of the heart sound envelope, means selectively connecting the outputs of said filters to said detector means, said connecting means and the responses of said filters being arranged such that all the energy deriving from said filters within the band $F_k$ and one of said limits is supplied to said detector means, where $F_k$ is the cut off frequency at one end of the $k$th filter and $k=1, 2, \ldots n$, and recorder means responsive to the signal deriving from said detector means, said recorder means having a frequency response sufficient to record said envelope but insufficient to record the upper frequencies in said band of heart sounds.

References Cited by the Examiner

UNITED STATES PATENTS

| | | | |
|---|---|---|---|
| 2,629,000 | 2/53 | Olson | 344—77 |
| 2,635,146 | 4/53 | Steinberg | 179—1 |
| 2,691,137 | 10/54 | Smith | 324—77 |
| 2,705,742 | 4/55 | Miller | 179—1 |
| 2,790,142 | 4/57 | Guthrie | 329—203 |
| 2,875,750 | 3/59 | Boucke | 128—2.05 |
| 2,946,645 | 7/60 | Schwarzer | 346—33 |
| 2,987,617 | 6/61 | Loughlin | 329—203 |
| 3,030,946 | 4/62 | Richards | 128—2.06 |
| 3,052,756 | 9/62 | Seven | 179—1 |
| 3,075,515 | 1/63 | Richards | 128—2.05 |
| 3,078,345 | 2/63 | Campanella | 179—15.55 |

OTHER REFERENCES

Electronics, December 1953, p. 193.

Sarbacher: Dictionary of Electronics, published 1959 by Prentice-Hall, TK7804 S37, pp. 632 and 1249.

RICHARD A. GAUDET, *Primary Examiner.*

RICHARD J. HOFFMAN, JORDAN FRANKLIN,
*Examiners.*